United States Patent
Huang et al.

(10) Patent No.: US 6,437,836 B1
(45) Date of Patent: Aug. 20, 2002

(54) EXTENDED FUNCTIONALLY REMOTE CONTROL SYSTEM AND METHOD THEREFORE

(75) Inventors: Eugene Huang, Philadelphia, PA (US); Peter Daley, Palo Alto, CA (US)

(73) Assignee: Navispace, Inc.

( * ) Notice: Subject to any disclaimer, the term of this patent is extended or adjusted under 35 U.S.C. 154(b) by 0 days.

(21) Appl. No.: 09/157,594

(22) Filed: Sep. 21, 1998

(51) Int. Cl.⁷ .............................. H04N 7/18; H04N 5/44; G08C 19/00
(52) U.S. Cl. ........................ 348/734; 348/906; 348/134; 340/825.25; 340/825.69; 340/825.72; 340/825.31; 340/825.24; 725/39; 725/40; 725/131; 725/132; 725/133; 341/175; 341/176
(58) Field of Search ........................... 348/10, 734, 906, 348/134; 345/327; 455/6.2, 6.3, 5.1, 4.2; 725/39–40, 131–133; 341/175, 176; 340/825.24, 825.72, 825.69, 825.25, 825.31

(56) References Cited

U.S. PATENT DOCUMENTS

| | | | |
|---|---|---|---|
| 5,231,493 A | | 7/1993 | Apitz |
| 5,253,066 A | | 10/1993 | Vogel |
| 5,282,028 A | * | 1/1994 | Johnson et al. ............... 358/86 |
| 5,410,326 A | * | 4/1995 | Goldstein .................... 348/134 |
| 5,479,266 A | | 12/1995 | Young et al. |
| 5,559,548 A | | 9/1996 | Davis et al. |
| 5,635,978 A | | 6/1997 | Alten et al. |
| 5,710,601 A | | 1/1998 | Marshall et al. |
| 5,710,605 A | * | 1/1998 | Nelson ........................ 348/734 |
| 5,724,492 A | * | 3/1998 | Matthews, III et al. ...... 395/119 |
| 5,883,680 A | * | 3/1999 | Nykerk ........................ 348/734 |
| 5,956,025 A | * | 9/1999 | Goulden et al. ............. 345/327 |
| 6,020,881 A | * | 2/2000 | Naughton et al. ........... 345/327 |
| 6,040,829 A | * | 3/2000 | Croy et al. .................. 345/327 |
| 6,097,441 A | * | 8/2000 | Allport ........................ 348/552 |
| 6,104,334 A | * | 8/2000 | Allport ........................ 341/175 |
| 6,195,548 B1 | * | 2/2001 | Schultheiss .................. 455/419 |

OTHER PUBLICATIONS

John C. Dvorak, "Inside Track," PC Magazine, p. 89, (Jun. 9, 1998).
No Author, "ANTEC Invests in Evolve Products", PR Newswire Jul. 30, 1998.
Anonymous, "The Evolution of Remote Controls.", The New York Times (Apr. 21, 1997).

(List continued on next page.)

Primary Examiner—John W. Miller
Assistant Examiner—Paulos Natnael
(74) Attorney, Agent, or Firm—Greenberg Traurig, LLP (57) ABSTRACT

An extended functionality remote control (EFRC) provides a hardware/software implementation of an integrated interface for remote control emulation. A PDA or other portable computing device is used as a platform for the EFRC application software and peripheral hardware. The EFRC also merges information services into remote controls. Implementation of these information services takes the form of, e.g., electronic program guides (EPGs) merged with the functioning of remote controls. In addition to the portable computing device, the hardware portion of the invention according to a preferred embodiment includes a keypad and an infrared transmitter subsystem which are managed by a microcontroller. The microcontroller also exchanges data with application software of the computing device via a serial communications link. The EFRC according to a preferred embodiment provides a universal remote control which can remain current by shifting the remote control code functions of a universal remote control from to software. New codes may be made available through the internet and downloaded into an application which can utilize these codes for the targeted consumer electronics device. The preferred embodiment provides the user the ability to select the components of their specific consumer electronic device on the World Wide Web, leading to the download of a data file by the user with all remote control code information preprogrammed into this data file. The preferred embodiment can dynamically construct the user's remote control buttons on a graphical touch screen, from information contained within the downloaded data file.

6 Claims, 7 Drawing Sheets

OTHER PUBLICATIONS

??, "Seven Named 'DEMO GODS' at Demo 96; PC Letter honors the best product demonstrators in the PC industry, nominated by attendees at sold–out industry event." Business Wire (Feb. 1, 1996).

"Sharp homes in on Pilot's palmtop market." PC Week (Apr. 14, 1997):3.

Dodge, Chris, "PC IT Remote Control Hardware." http://ee.washington.edu/eeca/circuits/PCIR/ pcirhw.html (Nov. 9, 1997).

Gallaga, Omra L., "Power in the palm." Austin American–Statesmen (Aug. 23, 1997).

IBM Press Release. "IBM Expands Its Portfolio of Mobile Solutions." (Sep. 23, 1997) http://www.us.pc.ibm.com/workpad/wp001.html (Oct. 11, 1997).

Montabana, Don, "My Man Newton." Penn Printout (Feb. 10, 1994): 3.

New bytes, Comdex–PDA's Galore (Nov. 16, 1993).

Rae–Dupree, Janet, "PalmPilot is handing industry a big lesson." Philadelphia Inquirer (Dec. 4, 1997).

Sharp Press Release, "Sharp Mobile Organizer Keeps User Connected to the Internet." (May 29, 1997).http://www.sharp.usa.com/daa/asp?bname–1125 (Oct. 11, 1997).

* cited by examiner

Figure 1A
(Front View)

Figure 1B
(Side View)

| Character Numbers | String Definitions | Character | Significance |
|---|---|---|---|
| 1 | Defines the IR Signal Type (REC80, Sony, RC-5). | 1 | REC80 coding scheme |
| 2 | Defines signal characteristics: address bits complementing, data bits complementing, stop bit usage, and tail bit usage. | 3 | "0011": No complementing, do stop bit, do tail. |
| 3-4 | Defines the number of address bits. | 08 | 8 address bits. |
| 5-6 | Defines the number of data bits. | 0E | 14 data bits (note that there is some overlapping which is dealt with the mask) |
| 7-10 | Defines the high time for the header. | 1F40 | Time is 8,000 μsec. |
| 11-14 | Defines the low time for the header. | 1F40 | Time is 8,000 μsec. |
| 15-18 | Defines the pulse time. | 07D0 | Time is 2,000 μsec. |
| 19-22 | Defines the "0" bit time. | 07D0 | Time is 2,000 μsec. |
| 23-26 | Defines the "1" bit time. | 1388 | Time is 5,000 μsec. |
| 27-30 | Defines the "high" time for the tail. | 3200 | Time is 12,800 μsec. |
| 31-34 | Defines the "low" time for the tail. | 0960 | Time is 2,400 μsec. |
| 35-38 | Defines the Address bits. | 9000 | Value is "1001000000000000" (non-masked). |
| 39-42 | Defines the Data bits. | 0B7E | Value is "0000101101111110" (non-masked). |
| 43-44 | Defines the Address Mask. | 20 | Value is "00100000" |
| 45-46 | Defines the Data Mask. | 80 | Value is "10000000" |
| 47-50 | Reserved for Expansion | 0000 | Reserved (may take any value). |

Figure 7

EXTENDED FUNCTIONALLY REMOTE CONTROL SYSTEM AND METHOD THEREFORE

BACKGROUND OF THE INVENTION

1. Field of the Invention

The invention relates in general to wireless remote control systems for controlling receiver devices, and in particular to a handheld device for displaying information and transmitting codes to a remote receiver device to cause said device to tune to a selected program.

2. Related Art

Remote controls have been available since the late 1950s, beginning with the single button "Cyclops" from RCA in 1959. Since then, both form and function have evolved beyond the original single button which controlled power and channel scrolling. Over time, remote controls and the consumer appliances which they control have experienced an exponential increase in complexity.

Resulting from the recognition of the problems associated with the growth in the number of remote controls around the home and their growing complexity, different attempts have been made to unify these devices and simplify their interfaces. In 1986, Steve Wozniak, a founder of Apple Computer, formed a company called Cloud 9 which attempted to build a universal remote control that would work with every electronic device. Cloud 9 eventually released a product called "CORE", which ultimately did not succeed in the consumer market due to the difficulty users had in remembering the functionality of programmed buttons.

These devices attempted to solve. a fundamental problem with consumer appliances; as appliances offer greater interactivity with users, the remote control in its present form will be unable to support these new innovations. These efforts ultimately failed due to the complexity of the remote control; instead of taking the complex functionality of a remote control and simplifying its use, these units took a complex remote control and made it more complex.

Today, remote controls can be classified into two distinct categories: "bundled" remote controls (included with consumer devices such as stereos and televisions) and aftermarket universal remote controls. "Bundled" remote controls typically serve to control only the component with which it was packaged.

Universal remote controls are available in a wide range of prices and features. Most are sold for under $50 and come configured for use with a wide range of standard components. Some of these remote controls possess the ability to learn new infrared codes as well. However, there is little value added by these devices apart from the ability to consolidate multiple remote controls into a single device. Downfalls include a loss of features which were available on the old remote control which are not available on the universal remote, a larger set of arcane buttons to search through, and difficulty adding new remote control emulation without the instruction book.

One device found at the high end of universal remote controls is the RR-990 (and its British counterpart, the Remote Angel IR-01) developed by Rotel. The RR-990 is a preprogrammed device which is also capable of learning new IR codes. The user interface is implemented entirely in software with a reasonable level of user customization. User input is accepted exclusively through an LCD touchscreen. The RR-990 can operate in two modes: one which provides access to all buttons and another which presents only basic functions. The RR-990 provides an advanced visual interface, but users complain that use of the LCD touchscreen for commonly used features is difficult.

The Marantz RC-2000 is another popular device which allows for automated key sequences through macros and a large number of user programmable buttons. Marantz also attempts to move some of the interface toward a software look-and-feel by using an LCD character display.

Perhaps the most advanced, and most costly, universal remote control is the Lexicon 700t. The 700t presents the user with a touch screen remote control which employs icons to navigate the interface of this computer-like device. Although fully customizable, the device must be programmed by a technician.

In the related art described above, a universal remote control's ability to operate with a plurality of consumer electronics devices is encoded into the remote control unit at the time of manufacture. As a result, the introduction of new consumer electronics devices (televisions, VCRs) operating with new coding schemes may lead to incompatibilities with the existing universal remote control. This gives rise to a problem in that existing universal remote control units may become obsolete. The related art also requires the programming of universal remote controls by the end user in such a manner which requires the end user to try multiple codes associated with a particular manufacturer to operate the target consumer electronics device.

Further, unique specialized functionality is often sacrificed on universal remote controls so that features may be included which are most commonly found in the greatest set of consumer electronics devices. When remote controls are designed to meet the needs of the lowest common denominator, the end-user may lose specialized functionality unique to their specific consumer electronic device.

Personal Digital Assistants (PDAs), also referred to as "miniature palmtop computers," define a group of computers and technologies emphasizing information portability. PDAs often incorporate mobile communications capabilities. Seeking to break the barriers which currently hinder the applicability and ease of use of current desktop and laptop computers, PDAs come packaged with a variety of "functional" applications (e.g. calendar, phone book, to do list).

The technologies underlying PDAs were first developed in the late 1980's as a digital, technology driven response to the tremendous growth in the market for personal organizers. PDAs have since developed down two competing designs: keyboard systems, such as the Sharp Wizard, and pen based systems, such as the PalmPilot.

Pen based PDA's were first debuted around 1993 with the introduction of the AT&T EO Personal Computer. Other systems include the Apple Newton MessagePad, the Tandy Zoomer, the IBM-BellSouth-Mitsubishi Simon and the Motorola Envoy. Many of these systems employed handwriting recognition technology for input; however, the systems required such precision that the units were nearly unusable in ordinary working conditions.

The PalmPilot was introduced in 1996 at an industry trade show. Separating the PalmPilot from its many competitors were the following features:

Lightweight (5.7 ounces) and compact design (3.1"×4.6"× 0.6")

Single-button synchronization of data with a personal computer

Highly accurate handwriting recognition based upon Graffitti® technology

The Palm III offered an update to the original PalmPilot series of PDAs by adding built-in infrared capabilities and extended memory. Trade press has also reported on the development of a new addition to the PalmPilot series called the "Razor". Slated for introduction at the beginning of 1999, the Razor will bring color capabilities to the PalmPilot series, as well as Web browsing, a new form factor, and additional connectivity features.

In the Spring of 1998, Microsoft and a number of different hardware companies offered devices running Windows CE for palm computers. The devices offer similar capabilities, features, and functionality to the PalmPilot series of PDAs.

Electronic Program Guides (EPGs), offering television program listings in an electronic format, have evolved from traditional print media sources such as TV Guide and listings found in local newspapers.

Electronic Program Guides (EPGs) are known for providing listings of scheduled programming. On-screen listings are one form of EPGs provided by cable/satellite/broadcast service providers offering differing levels of service. Some services, such as the Prevue Channel, simply provide a rolling grid of listings. Services such as this do not allow for any level of interaction by the user. These services are typically provided free of charge with basic cable.

More advanced services, such as those provided by GEM-STAR's StarSight and satellite television service providers, allow for user interaction. The user can move a cursor through a grid of listings and direct the program guide to change the channel based on the program which is selected. The StarSight system requires a compatible TV and VCR (or enabling hardware).

The World Wide Web has emerged in recent years as an alternative method of distributing and displaying EPGs. Nearly all are free-of-charge and the most advanced services are fully customizable. Related content, such as program descriptions, interviews, and commentary, are also available. Some of the more popular web sites include GIST (http://www.gist.com), TVGuide Entertainment Network (http://www.tvgen.com), and UltimateTV (http://www.ultimatetv.com). Despite the many positive features these firms have developed in their sites, web-based services lack the ease of use found in print media and on-screen services. For instance, a television viewer who wants to know when a movie will be showing is not likely to have a web browser immediately available for use in front of the television. This lack of portability will likely hinder the long term prospects of web-based efforts.

OBJECTS AND SUMMARY OF THE INVENTION

It is therefore an object of the invention to provide an improved, extended functionality remote control.

It is a further object of the invention to provide a remote control which overcomes limitations of the prior art as set forth above.

In a preferred embodiment, the invention provides an extended functionality remote control (EFRC) which is a hardware/software implementation of an integrated interface for remote control emulation. A PDA or other portable computing device is used as a platform for the EFRC application software and peripheral hardware. The EFRC also merges information services into remote controls. Implementation of these information services takes the form of, e.g., electronic program guides (EPGs) merged with the functioning of remote controls.

In addition to the PDA platform, the hardware portion of the invention according to a preferred embodiment includes a keypad and an infrared transmitter subsystem which are managed by a microcontroller. The microcontroller exchanges data with PDA's application software via a serial communications link. Remote control emulation and the electronic program guide are implemented in application software written for the PDA's operating system.

The EFRC according to a preferred embodiment provides a universal remote control which can remain current by shifting the remote control code functions of a universal remote control from firmware, where it is pre-encoded and not modifiable at any time, to software. New codes may be made available at all times through the internet and downloaded into an application which can utilize these codes for the targeted consumer electronics device.

To overcome current problems with the programming of present universal remote controls, the preferred embodiment provides the user the ability to select the components of their specific consumer electronic device on the World Wide Web, leading to the download of a data file by the user with all remote control code information preprogrammed into this data file.

To accomplish the preservation of specialized functionality and features, the universal remote control according to its preferred embodiment can dynamically construct the user's remote control buttons on a graphical touch screen, from information contained within the downloaded data file.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Various hardware platforms may be used to practice the invention. In a preferred embodiment, a 3Com PalmPilot PDA is used. An infrared transmission system, and preferably an associated keypad, is provided as a peripheral to the PalmPilot. The infrared transmission system allows for infrared communications with consumer electronics devices. The keypad provides an alternate method to the touch screen for user input. This keypad may provide basic functions (numbers, volume up/down, channel up/down, mute) since end-users can often manipulate a remote control from the tactile sensation of the buttons alone. With no touch-cues on the graphical touch screen, this keypad may, at times, provide a more convenient interface for user input, allowing for ease in the manipulation of essential functions by the user.

Keypad emulation is controlled in software. As a result, if the software is set to emulate a home stereo system, a depressed key (such as volume up) will be directed to the stereo system. Likewise, if the software is set to emulate a television, a depressed key will be directed to the television.

To maintain maximum flexibility, a coding scheme was developed to encapsulate all potential infrared coding schemes so that the infrared transmission system can dynamically generate any form of different infrared codes. This code is sent from the application to the infrared transmission system, which then generates the corresponding infrared bit stream.

An electronic program guide is provided on the PDA's screen. The electronic program guide obtains information from data files downloaded via the Internet, customized to one's local cable or over-the-air broadcast television systems. The electronic program guide is seamlessly integrated with the remote: clicking on a program will allow one to immediately change to that program. In addition, other information features, such as automatic recording of a VCR, can be accessed in a simple and intuitive matter.

Filtering and find capabilities of the electronic program guide also allow for ease of selection of programming. Filtering by subject content allows an individual to sort through multiple channel listings to get to the programs which the user would like to see. Likewise, find provides a more directed approach to finding a specific program.

Figure 1A:
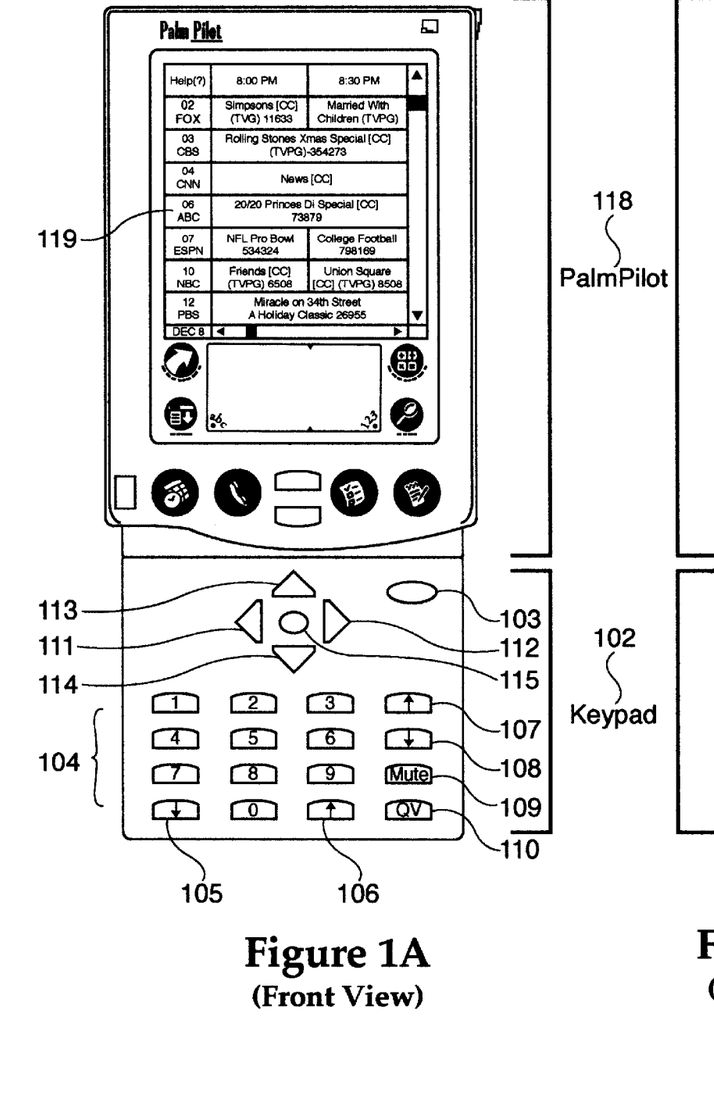
FIG. 1A is a front plan view of the invention according to a preferred embodiment.
Figure 1B:
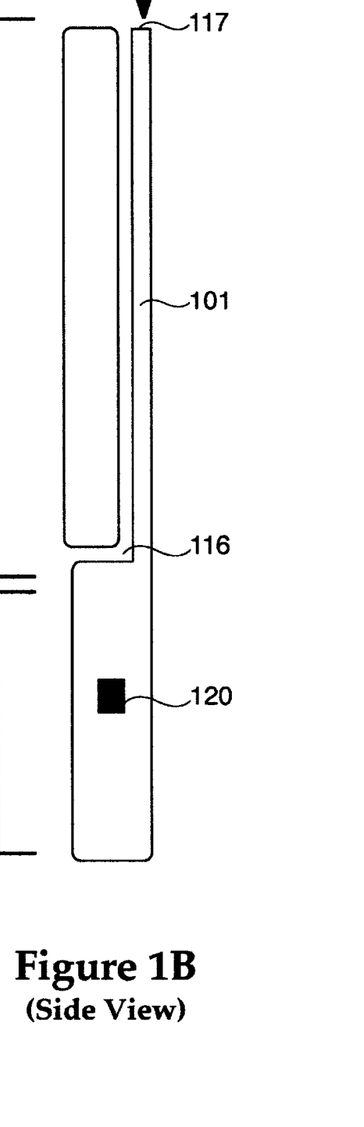
FIG. 1B is a side-elevation view of the invention according to a preferred embodiment.

FIGS. 1A and 1B are, respectively, front view and side-elevation view diagrams of the preferred embodiment constructed in accordance with the principles of the present invention. In FIG. 1A, a complete key arrangement of the invention with backplane 101 is shown as used in the keypad pushbuttons 205. The invention is shown attached by a serial port 116 to a personal digital assistant or other portable computer device 118. In the keypad unit 102 of FIG. 1A, reference numeral 103 designates a pushbutton for the power supply of the receiving terminal, 104 indicates numerical keys, 105 indicates up channel, 106 indicates down channel, 107 indicates increase volume, 108 indicates decrease volume, 109 indicates mute, and 110 indicates quick view, which allows a user to toggle back and forth between the currently selected television program and the television program immediately previously viewed.

Directional keys, such as the left arrow 111, right arrow 112, up arrow 113, and down arrow 114, allow for the selection of programming on the electronic program guide 119. Specifically, the left arrow 111 and right arrow 112 allow for backwards and forwards scrolling of programming in different time slots at thirty minute time intervals. The up arrow 113 and down arrow 114 allow for horizontal and vertical scrolling of programming within a specified time slot. A smart button 115 provides for selection of the highlighted program on the electronic program guide.

A serial port 116 provides a data connection between the invention 101 and the personal digital assistant or other portable computer device 118. The backplane located on the invention 101 provides mechanical support of the personal digital assistant or other portable computer device 118 while also providing a housing for the infrared (IR) transmitter and light emitting diode (LED) 117.

Figure 2:
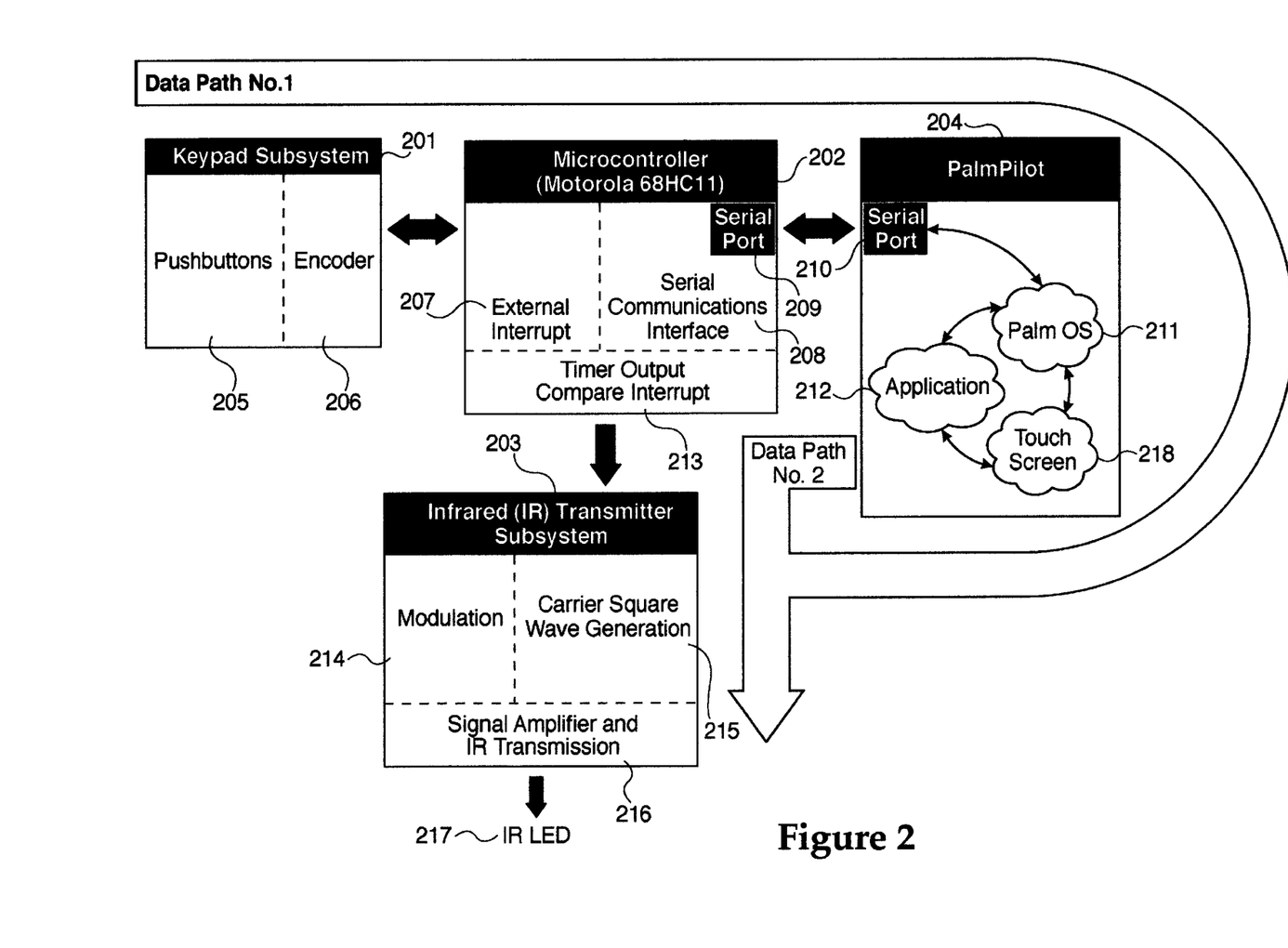
FIG. 2 is a schematic diagram showing the data paths demonstrating the movement of data between subsystems according to a preferred embodiment of the invention.

FIG. 2 is a diagram showing the fundamental construction of the extended functionality remote and software-based remote control and electronic program guide according to an embodiment of the present invention. A hardware attachment is comprised of three subsystems: a keypad subsystem 201, a microcontroller 202, and a infrared transmitter subsystem 203. The microcontroller 202 may comprise, e.g., a Motorola 68HC11 microcontroller. A personal digital assistant or other portable computer device 204 is used to receive, process, and send information to the hardware attachment related to remote control emulation and the electronic program guide.

A user initiated keystroke is applied to the pushbuttons 205 located on the keypad subsystem 201, which, in the present embodiment, has a key arrangement as shown in FIG. 1A. An encoder 206 translates the pushbutton input into a 5-bit binary code representation of the number which is then sent to the microcontroller 202. The arrival of binary code data results in an external interrupt 207. This binary code data is passed to the serial communications interface 208, from the serial port 209 on the microcontroller 202 to the serial port 210 on the personal digital assistant or other portable computer device 204.

The operating system 211 passes the keypad information to the application 212 which converts the keypad information into the appropriate remote control code data sequence. Details of the remote control code data sequence and the generation of such data will be described below.

The remote control code sequence is passed back through the operating system 211 and serial ports 210 and 209 to the serial communications interface 208. Data received in this manner from the serial port 209 is processed by the microcontroller 202, converting the remote control code sequence into a binary code for transmission by the infrared transmitter subsystem 203. This conversion also triggers a timer output compare interrupt 213, while appropriate modulation 214 is applied in conjunction with the carrier square wave generation 215, with the resulting signal amplified and transmitted by the signal amplifier and IR transmission 216 module which strobes a regular infrared LED 217.

An alternate method of data transmission is initiated by user input on the touch screen 218 located on the personal digital assistant or other portable computer device 204. Details of on-screen generation of information is described in FIG. 5. User input is processed by the operating system 211 and passed to the application 212, converting the keypad information into the appropriate remote control code data sequence. Data is then passed through the operating system 211 and serial port 210 through to the LED 217 as described above.

Figure 3:
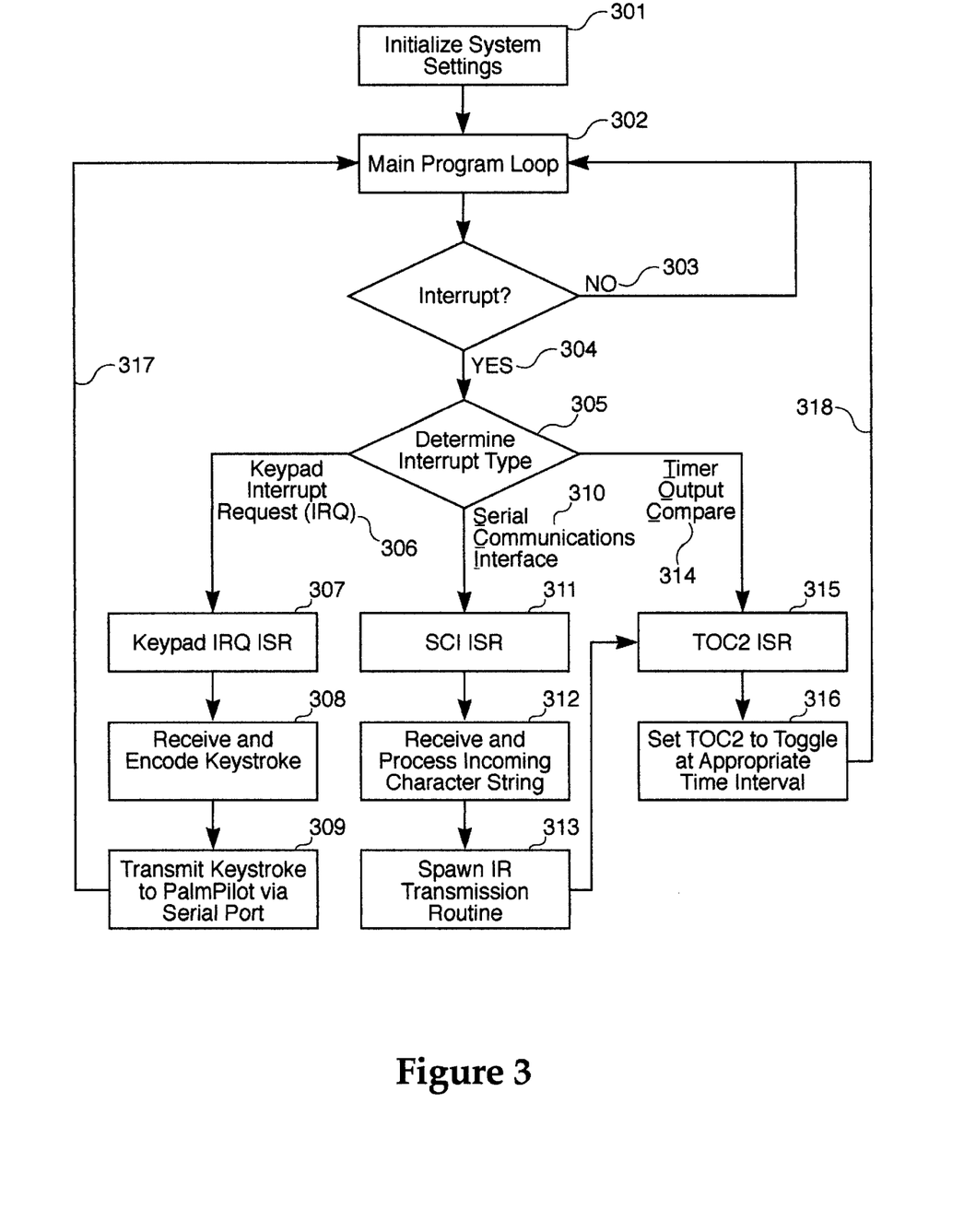
FIG. 3 is a flow chart illustrating the operational flow of the encoding of a keystroke in software.

The microcontroller 202 data flow operational procedure according to the present embodiment will now be described with reference to an operational flow chart shown in FIG. 3. When device of the invention is turned on by means of the toggle switch 120, system settings are initialized (step 301), which include but are not limited to the loading of pre-defined registers and the initialization of memory. The microcontroller 202 will then execute the main program loop (step 302), which then infinitely loops in an idle state waiting for an externally generated interrupt (step 303). Should an interrupt occur (step 304), the microcontroller determines the interrupt type which has been received (step 305). An interrupt is generated in response to any of three different instances, described below.

First, as a result of a 5-bit binary encoded representation of the keypad pushbutton number 205 being set by the encoder 206, a Keypad Interrupt Request (IRQ) is registered by the microcontroller 202 (step 306). The interrupt is then cleared (step 307), allowing for normal return to the main program loop (step 617) immediately after the routine completes the reception and encoding of the keystroke by the microcontroller 202 (step 308), and the transmission of the keystroke to the personal digital assistant or other portable computing device 204 (step 309).

Second, as a result of the reception of data from the serial port 210 of the personal digital assistant or other portable computing device 204, a Serial Communications Interface Interrupt Request (IRQ) is registered by the microcontroller 202 (step 310). After the interrupt is then cleared (step 311), allowing for the launching of the infrared transmission routine (step 313), the remote control code received from the personal digital assistant or other portable computing device 204 is converted into a binary representation for transmission by the IR transmission 216 module (step 312).

Third, as a result of an attempt to convert a received remote control code sequence into a binary code for transmission by the infrared transmitter subsystem 203, a Timer Output Compare Interrupt Request (IRQ) is registered by the microcontroller 202 (step 314). After the interrupt is then cleared (step 315), allowing for normal return to the main program loop (step 318), an internal timer is set for proper timing of the transmitted IR code (step 316).

Figure 4:
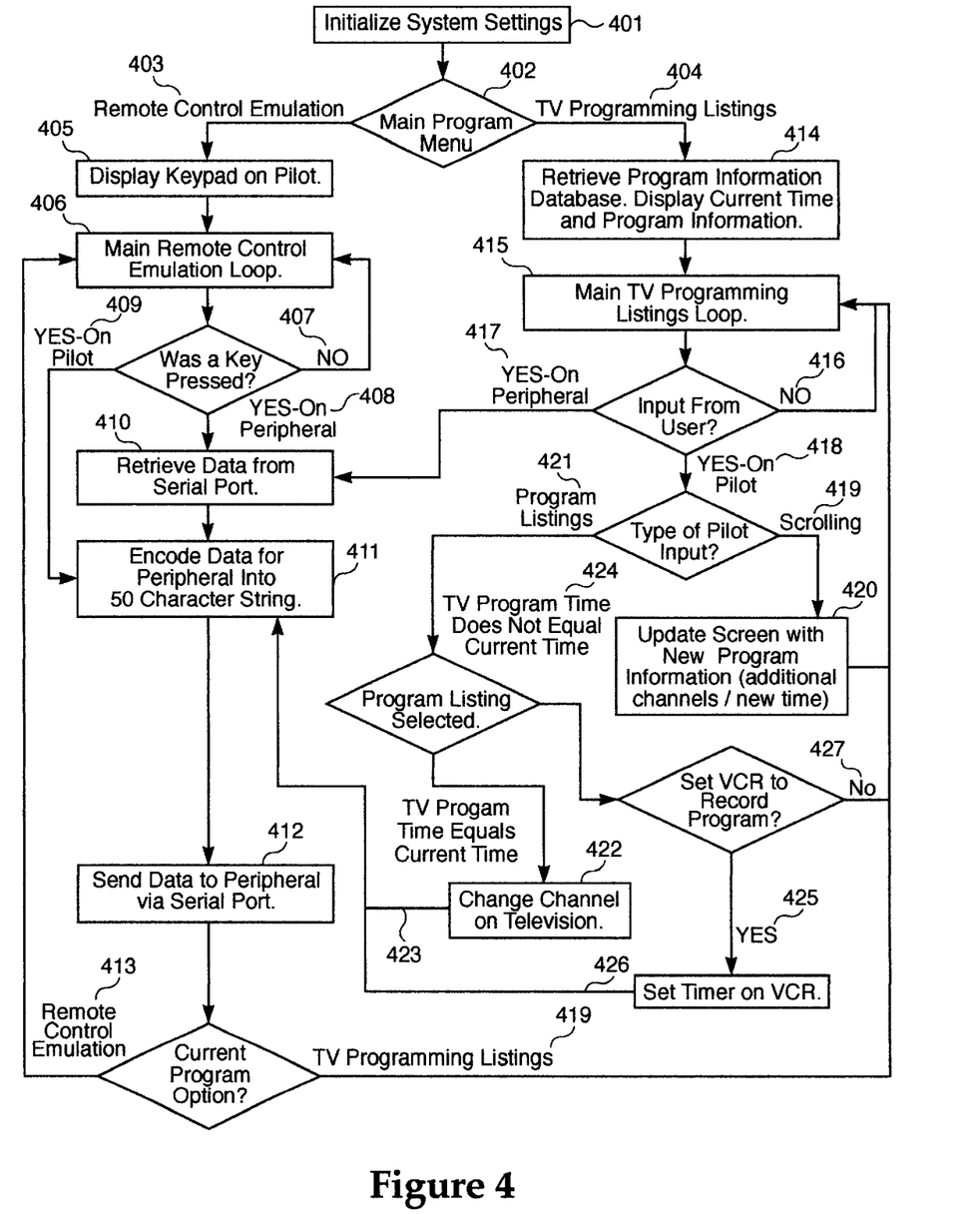
FIG. 4 is a flow chart illustrating the operational flow of the dynamically generated keypad and dynamically generated electronic program guide according to a preferred embodiment of the invention. The flow chart also details the interaction between remote control code sequence emulation and the electronic program guide.

The application 212 data flow operational procedure according to the present embodiment will now be described with reference to an operation flow chart in FIG. 4. When the personal digital assistant or other portable computing device 204 is turned on and the program is launched, software settings are initialized and loaded into memory (step 401). The main program menu is also preloaded (step 402). A graphical representation of the main program menu can take multiple forms based upon the number of components to an individual's home theater system, but this graphical representation primarily takes two forms representing two main groups of choices for the user: remote control emulation (step 403) or the electronic program guide (step 404).

Figure 6:
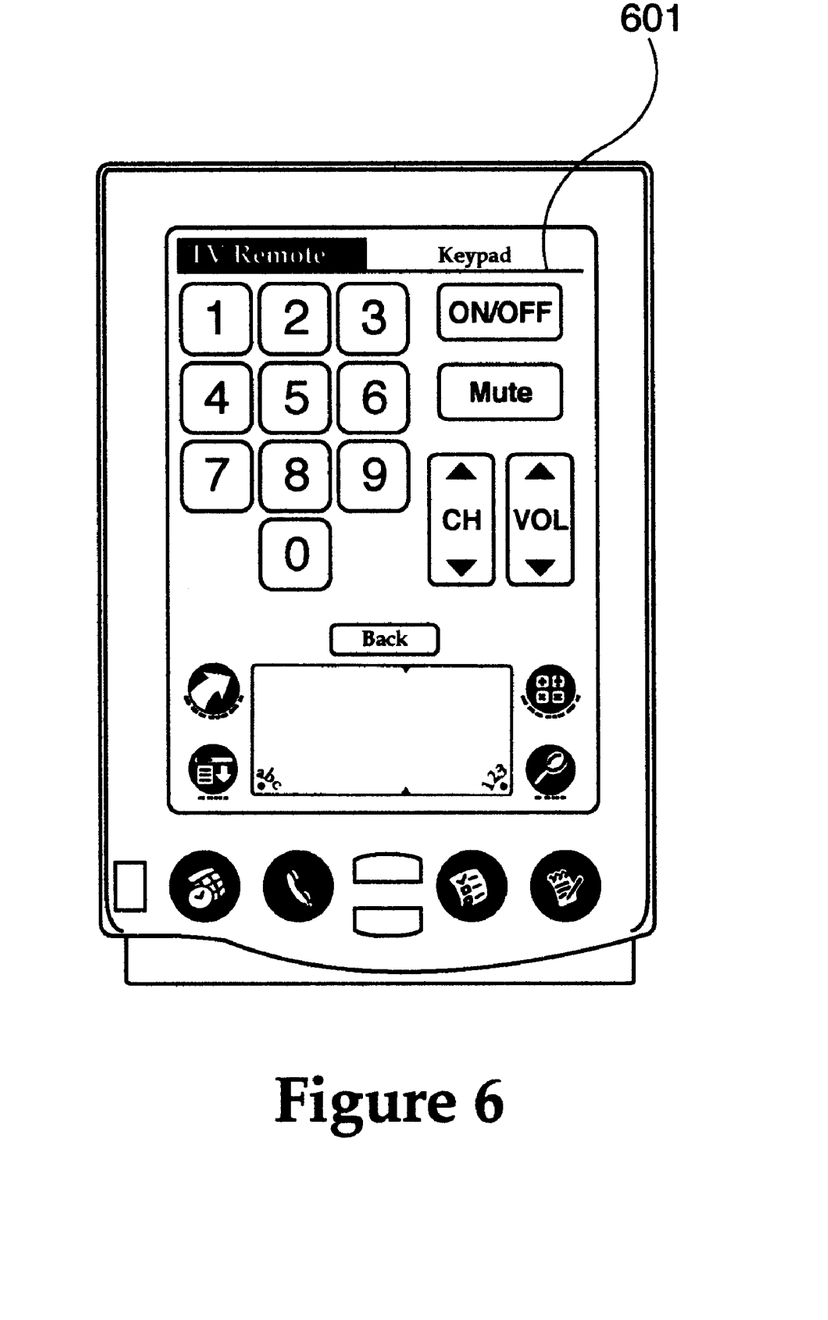
FIG. 6 is a front view illustrating the user interface of a dynamically generated keypad.

Selection of remote control emulation (step 403) results in the display of a keypad as represented in one format in FIG. 6 (step 405). The main remote control emulation loop (step 406) is then executed, which sits in an idle state waiting for the receipt of data indicating that a key was pressed (step 407). The initial screen for the remote control presents a user with the most commonly used buttons (e.g. volume up, volume down, numerical buttons) or a customized screen constructed by the user. In further drop-down screens, accessible from this initial screen, specialized buttons grouped by functionality will be available to the user. By employing a touch screen, one can dynamically generate remote control buttons, thereby avoiding the constraints associated with determining which particular buttons should be included in the design of a universal remote control, and which buttons should be left out.

User input from a depressed key can be generated through the keypad pushbuttons 205 (step 408), which then retrieves data from the serial port 210 (step 410), or the touch screen 119 (step 409). In both cases, the depressed key is encoded into a fifty character string (step 411); this data is then sent to the invention via the serial port 210 (step 412). Since the program is currently performing remote control emulation (step 403), the program will loop back to the main remote control emulation loop (step 413).

Figure 5:
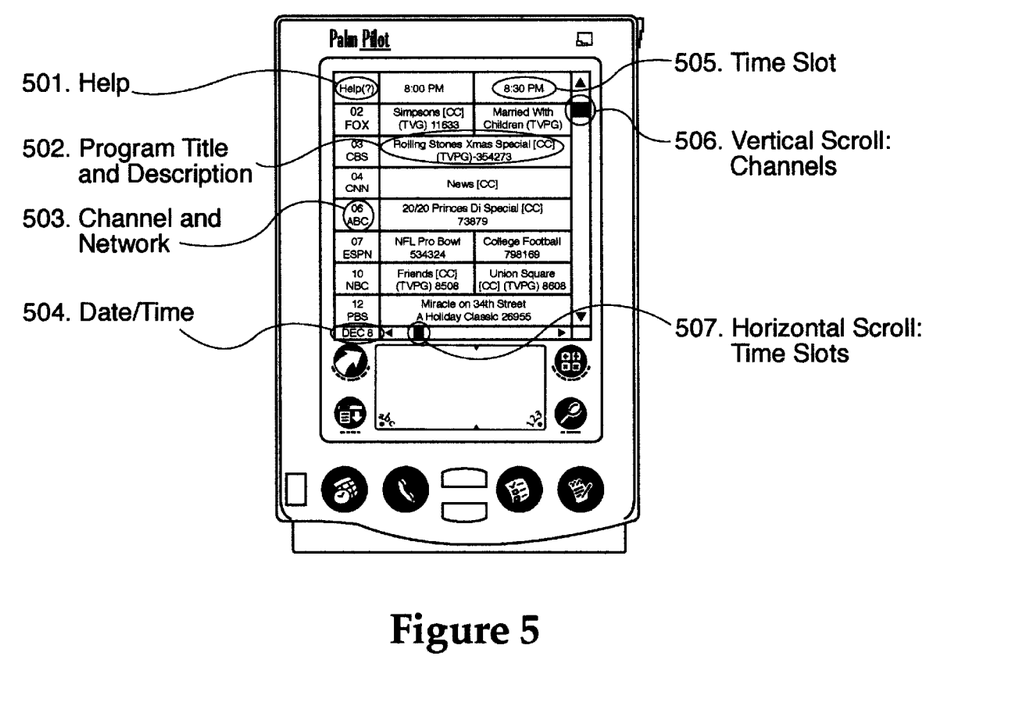
FIG. 5 is a front view illustrating the user interface of the electronic program guide.

Selection of the electronic program guide (step 404) results in the retrieval and display of program information, as represented in FIG. 5, based upon the current time from the operating system 111 (step 414). The main electronic program guide loop (step 415) is then executed, which sits in an idle state waiting for the receipt of data indicating that input has come from the user (step 416). User input may be generated by two methods, described below.

The first method is via the keypad pushbuttons 205 (step 417), which leads sequentially to the retrieval of data from the serial port 210 (step 410) through to the retransmission of encoded data (step 412). However, since the program is currently generating the electronic program guide (step 404), the program will loop back to the main television programming listings loop (step 419). The second method is via the personal digital assistant or other portable computing device 204 (step 418).

The application then determines whether the input is related to scrolling (step 419), where the screen is then updated with new program information before returning to the main electronic program guide loop (step 420), or the selection of a program listing on the electronic program guide (step 421). Once a program listing is selected, if the program is still playing, the television program is changed (step 422), with the applicable data encoded for the invention (step 423). Otherwise, if the program will play in the future (step 424), a dialog will prompt the user allowing them to program a VCR for automatic recording (step 425), with the applicable data encoded for the invention (step 426), or the dismissal of the dialog, returning the user to the main electronic program guide loop (step 427).

FIG. 5 is an example of the graphical representation of the dynamically generated electronic program guide displayed as step 404 of the application 212 data flow operational procedure. On-screen icons and activity areas include help 501, the program title and brief description 502, the channel and network name 503, the current date and time 504, half-hour time slots 505, a vertical scroll bar 506 and a horizontal scroll bar 507. The vertical scroll bar 506 works in conjunction with the up arrow 113 and down arrow 114 directional keys, and the horizontal scroll bar 507 works in conjunction with the left arrow 111 and right arrow 112 directional keys, each performing the same function in the manner specified for these keys.

FIG. 6 presents an example of the graphical representation of the dynamically generated remote control buttons displayed as step 403 of the application 212 data flow operational procedure. A generic remote control with standard features is displayed; however, the dynamically generated nature of the remote control features allows for alternate display representation to fully encapsulate features specific to a user's preferences or a customized home-theater setup. A feature common to this user interface representation is a "Keypad" indicator 601, which echoes the user input on the keypad pushbuttons 205.

Figure 7:
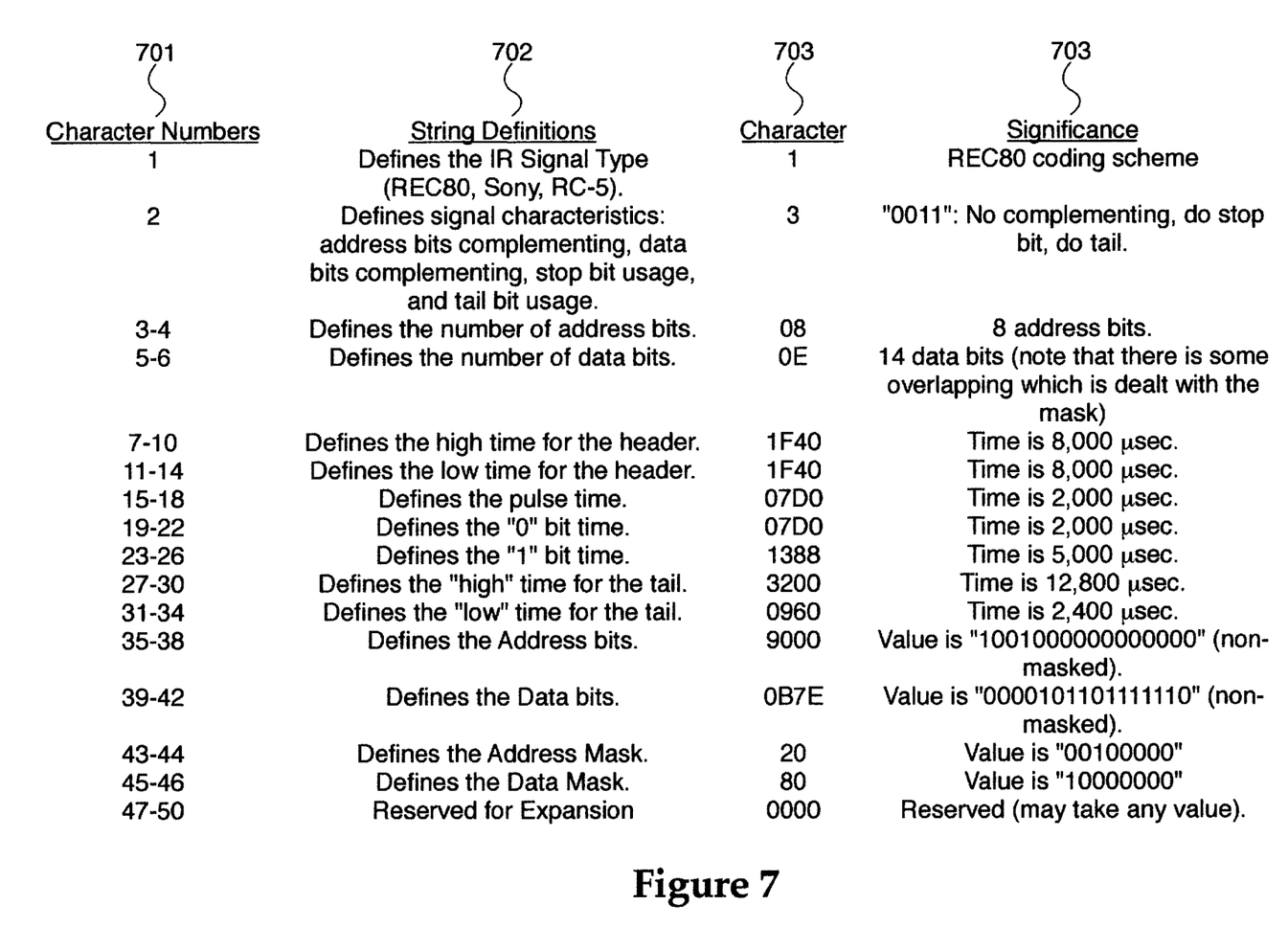
FIG. 7 is a table illustrating the storage structure of a character string generated in software for infrared codes.

FIG. 7 presents a table defining the fifty character sequence, with the character number in the first column 701, the string definition provided in the second column 702, and examples of an encoded string provided in the third and fourth columns 703.

The EFRC addresses limitations of traditional hardware-based universal remote controls such as inflexibility in the implementation of new remote control codes and the limited set of predetermined "core functions" resulting from the static nature of a hardware device. By implementing functionality in software, the EFRC provides nearly limitless flexibility in overcoming these constraints.

The invention provides significant advantages over conventional "on-screen" electronic program guides because it does not require the television screen to be obscured by TV listings. Providing listings and other services on-remote allows for pre-screening of listings and the use of other features without disturbing others who are watching the TV. Additionally, the invention provides a portable platform to access television programming information with universal compatibility. Individuals can therefore access the invention's advanced features without the need for proprietary hardware.

While the invention has been particularly shown and described with reference to a preferred embodiment thereof, it will be understood by those skilled in the art that various changes in form and details may be made therein without departing from the spirit and scope of the invention. For example, the invention may be practiced as a single integrated unit, rather than as an add-on device to personal digital assistants. Further, an encoding scheme and wireless transmitter other than an infrared-type transmitter could be used without departing from the spirit and scope of the invention. For example, a Radio Frequency (RF) transmitter could be used in lieu of or in addition to the infrared transmitter described above.

Another method by which the invention may be practiced is the utilization of preexisting infrared transmission subsystems, such as those included with the Palm III series of personal digital assistants by 3Com. Practicing the invention in this manner could include provision of the software with a simplified keypad unit which would not include the infrared transmission subsystem. As a result, data would not be retransmitted through the serial port of the personal digital assistant or other portable computing device, but rather, directly to the infrared transmitter subsystem.

The embodiments of the invention in which an exclusive property or privilege is claimed are defined as follows:

1. A handheld system for remote program guide viewing and program selection, comprising:
    means for receiving and storing program guide data, wherein said program guide data includes a program guide containing a plurality of scheduled programs;
    a software application means for implementing each of said plurality of scheduled programs into encoded data;
    a touch screen display means for displaying said program guide containing said plurality of scheduled programs;
    means for receiving user input indicating a selection of at least one of said scheduled programs through at least said touch screen display means;
    a wireless transmitter subsystem for receiving said encoded data corresponding to said selected scheduled program from said software application means, for generating a signal derived from said encoded data for said selected scheduled program, and for transmitting said signal to a remote receiver device, whereby said remote receiver device is caused to tune to said selected scheduled program; and
    said means for receiving and storing, means for displaying, means for receiving user input, software application means, and wireless transmitter subsystem each being incorporated into a handheld device.

2. A handheld device for remote program guide viewing and program selection, comprising:
    a memory system for receiving and storing program guide data, wherein said program guide data includes a program guide containing a plurality of scheduled programs;
    a software application for implementing each of said plurality of scheduled programs into encoded data;
    a touch screen display system for displaying said program guide containing said plurality of scheduled programs;
    a processor for receiving user input indicating a selection of at least one of said scheduled programs through at least said touch screen display system; and
    a wireless transmitter subsystem for receiving said encoded data corresponding to said selected scheduled program from said software application, for generating a signal derived from said encoded data for said selected scheduled program, and for transmitting said signal to a remote receiver device, whereby said remote receiver device is caused to tune to said selected scheduled program.

3. A handheld device for remote program guide viewing and program selection, comprising:
    a memory system for receiving and storing program guide data, wherein said program guide data is received over an Internet connection, and wherein said program guide data includes a program guide containing a plurality of scheduled programs;
    a software application for implementing each of said plurality of scheduled programs into encoded data;
    a touch screen display system for displaying said program guide containing said plurality of scheduled programs;
    means for receiving user input indicating a selection of at least one of said scheduled programs through at least said touch screen display means;
    a wireless transmitter subsystem for receiving said encoded data corresponding to said selected scheduled program from said software application means, for generating a signal derived from said encoded data for said selected scheduled program, and for transmitting said signal to a remote receiver device, whereby said remote receiver device is caused to tune to said selected scheduled program.

4. A handheld device for remote program guide viewing and program selection, comprising:
    a first communications system for receiving program guide data, wherein said program guide data includes a program guide containing a plurality of scheduled programs;
    a software application for implementing each of said plurality of scheduled programs into encoded data;
    a memory system for storing said program guide data,
    a touch screen display system for displaying said program guide containing said plurality of scheduled programs;
    means for receiving user input indicating a selection of at least one of said scheduled programs through at least said touch screen display means; and
    a second communications system comprising a wireless transmitter subsystem for receiving said encoded data corresponding to said selected scheduled program from said software application means, for generating a signal derived from said encoded data for said selected scheduled program, and for transmitting said signal to a remote receiver device, whereby said remote receiver device is caused to tune to said selected scheduled program.

5. The handheld device of claim 4, wherein said first communications system receives said program guide data over an Internet connection.

6. A handheld system for remote program guide viewing and program selection, comprising:

a handheld device, comprising:
  a touch screen display for displaying program guide data, wherein said program guide data includes a program guide containing a plurality of scheduled programs, and for receiving a first user input;
  a software application for implementing each of said plurality of scheduled programs into encoded data; and
  a first serial port for communicating with a second serial port; and
an attached device comprising:
  a keypad subsystem for receiving a second user input;
  said second serial port;
  a microcontroller for handling communications between said first serial port and said second serial port; and
  an infrared transmitter subsystem for receiving said encoded data corresponding to said selected scheduled program from said software application, for generating a signal derived from said encoded data for said selected scheduled program, and for transmitting said signal to a remote receiver device, whereby said remote receiver device is caused to tune to said selected scheduled program.

* * * * *